May 2, 1950     J. S. BURGE ET AL     2,505,942
SPRING LOOP FORMING DEVICE
Filed Jan. 9, 1947     12 Sheets-Sheet 1
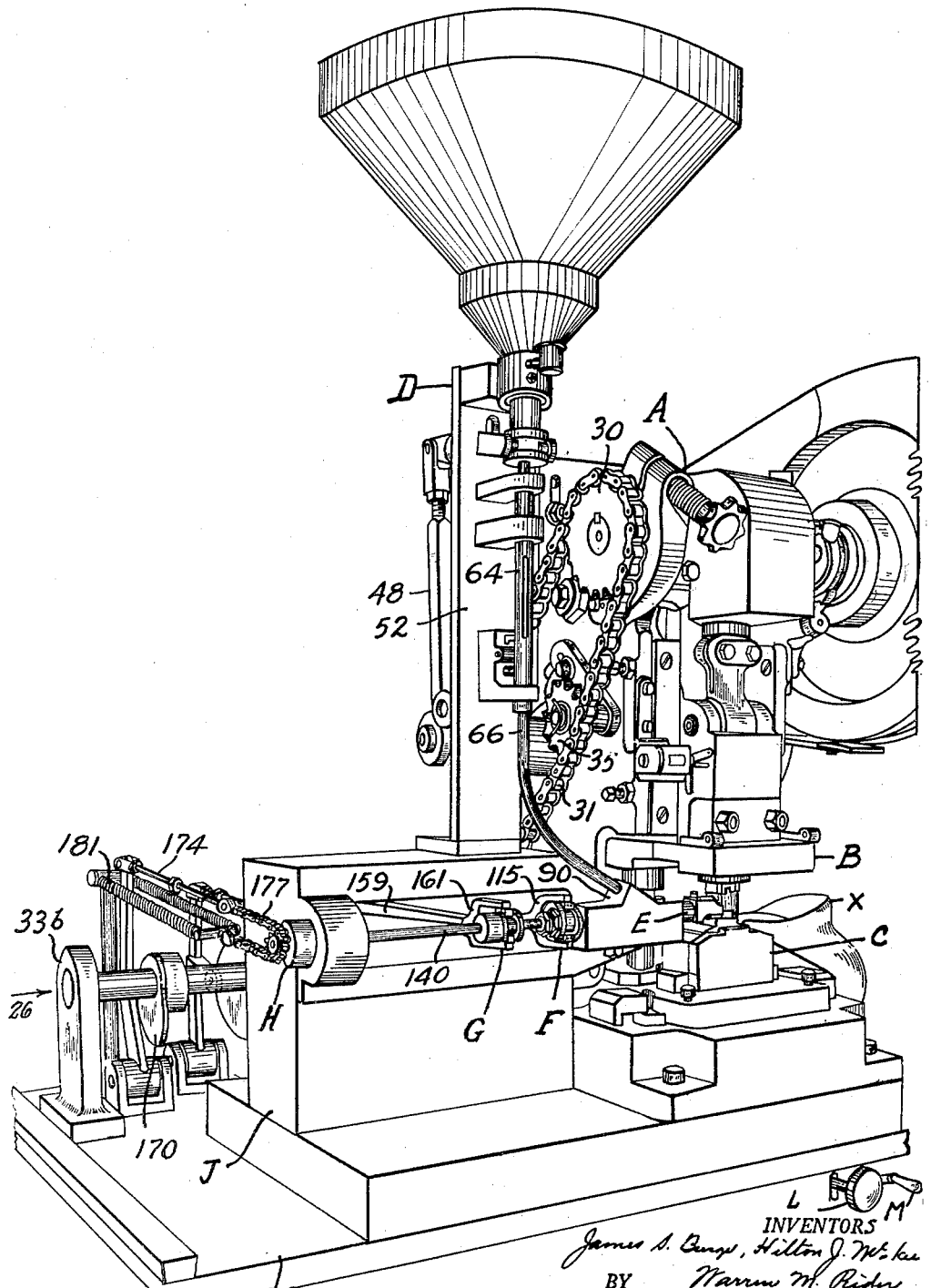
Fig. 1
INVENTORS

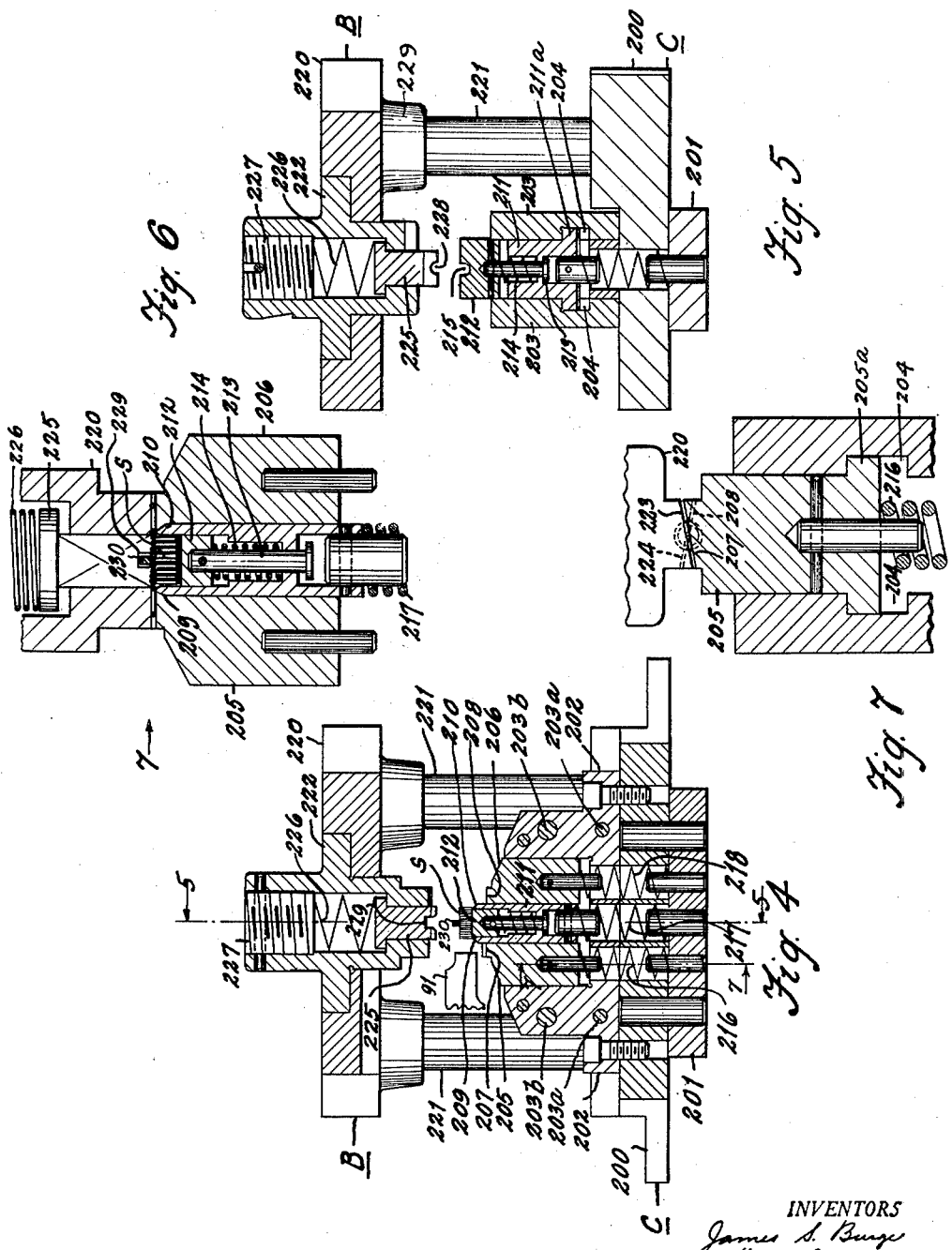

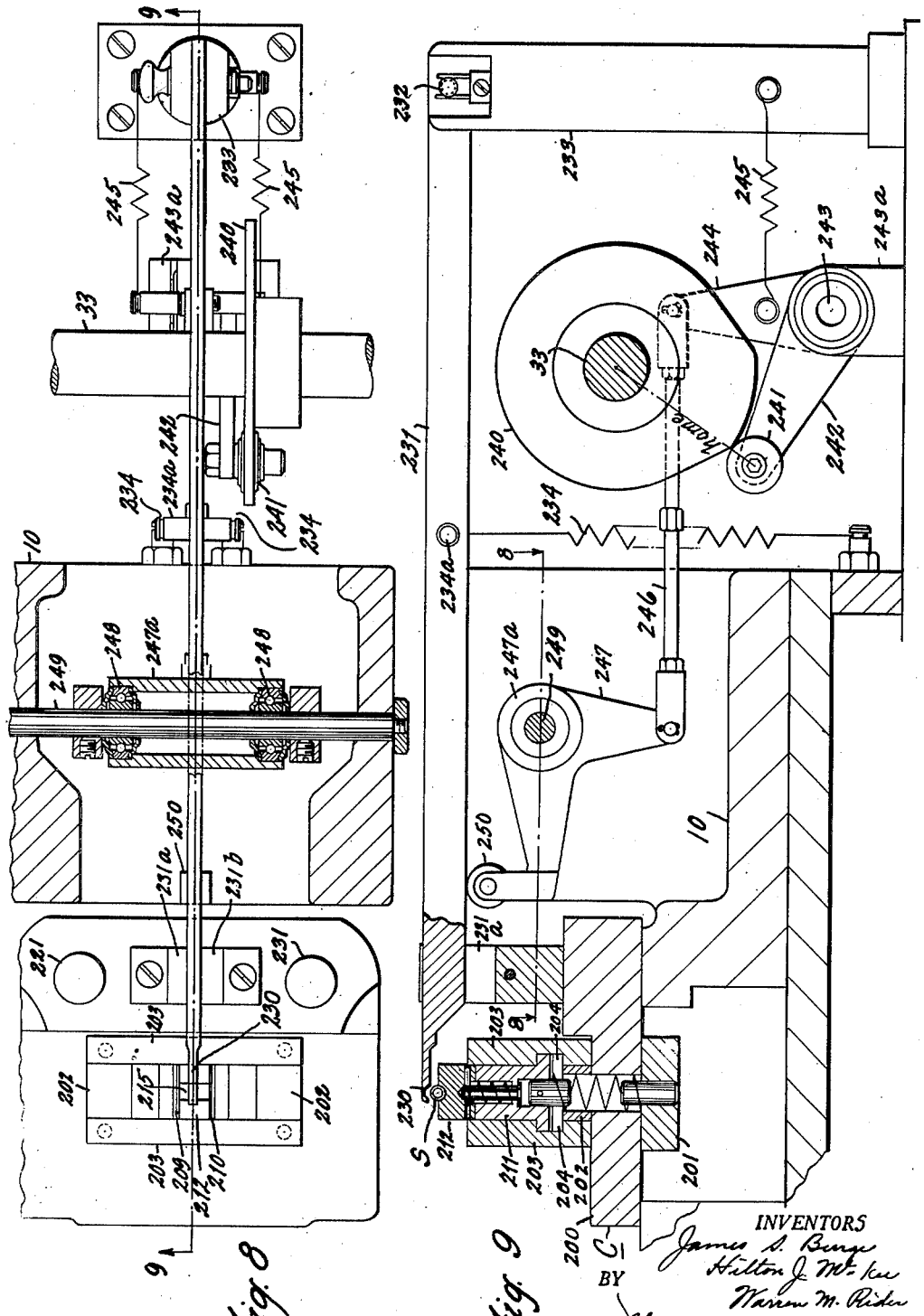

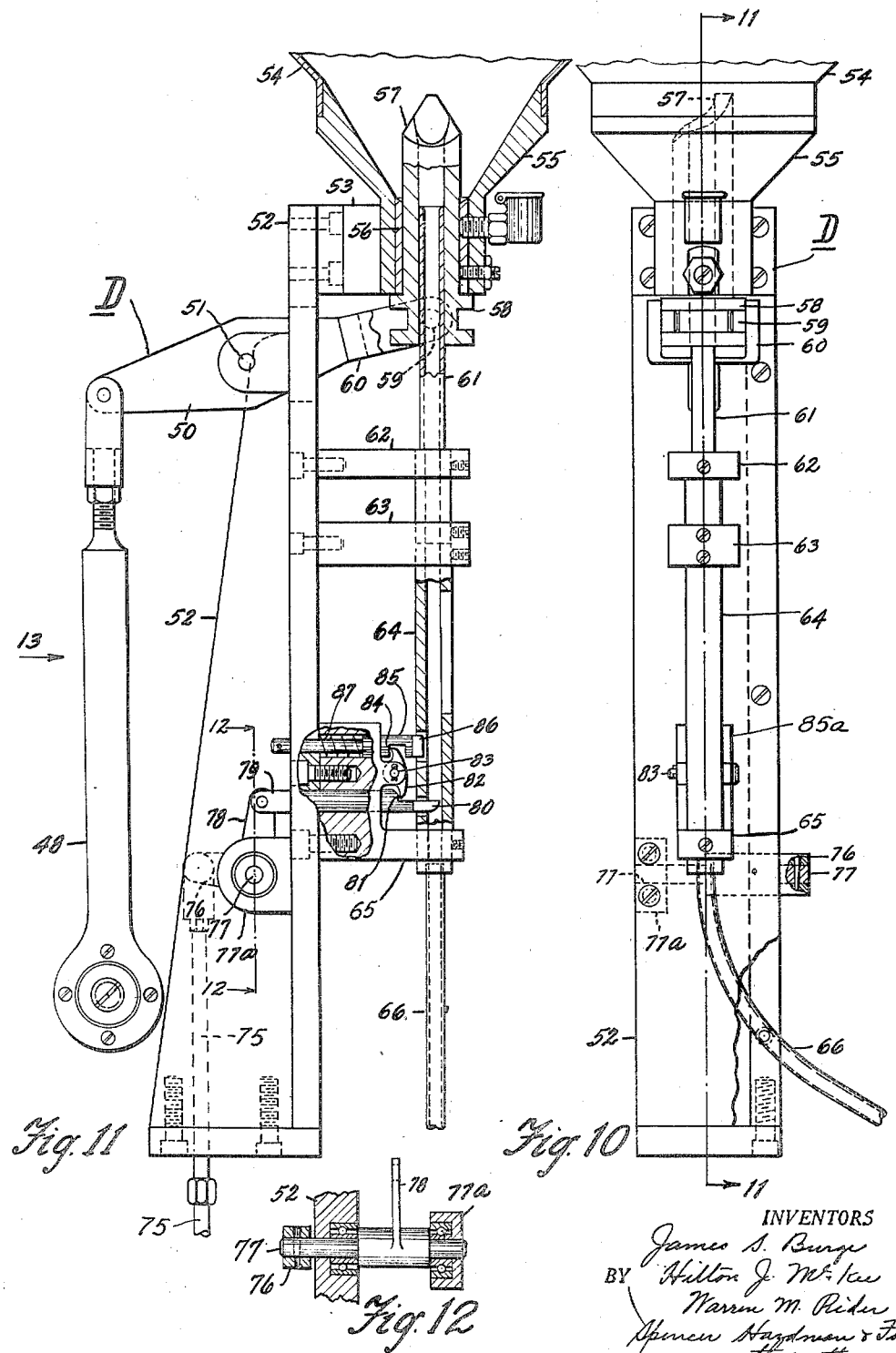

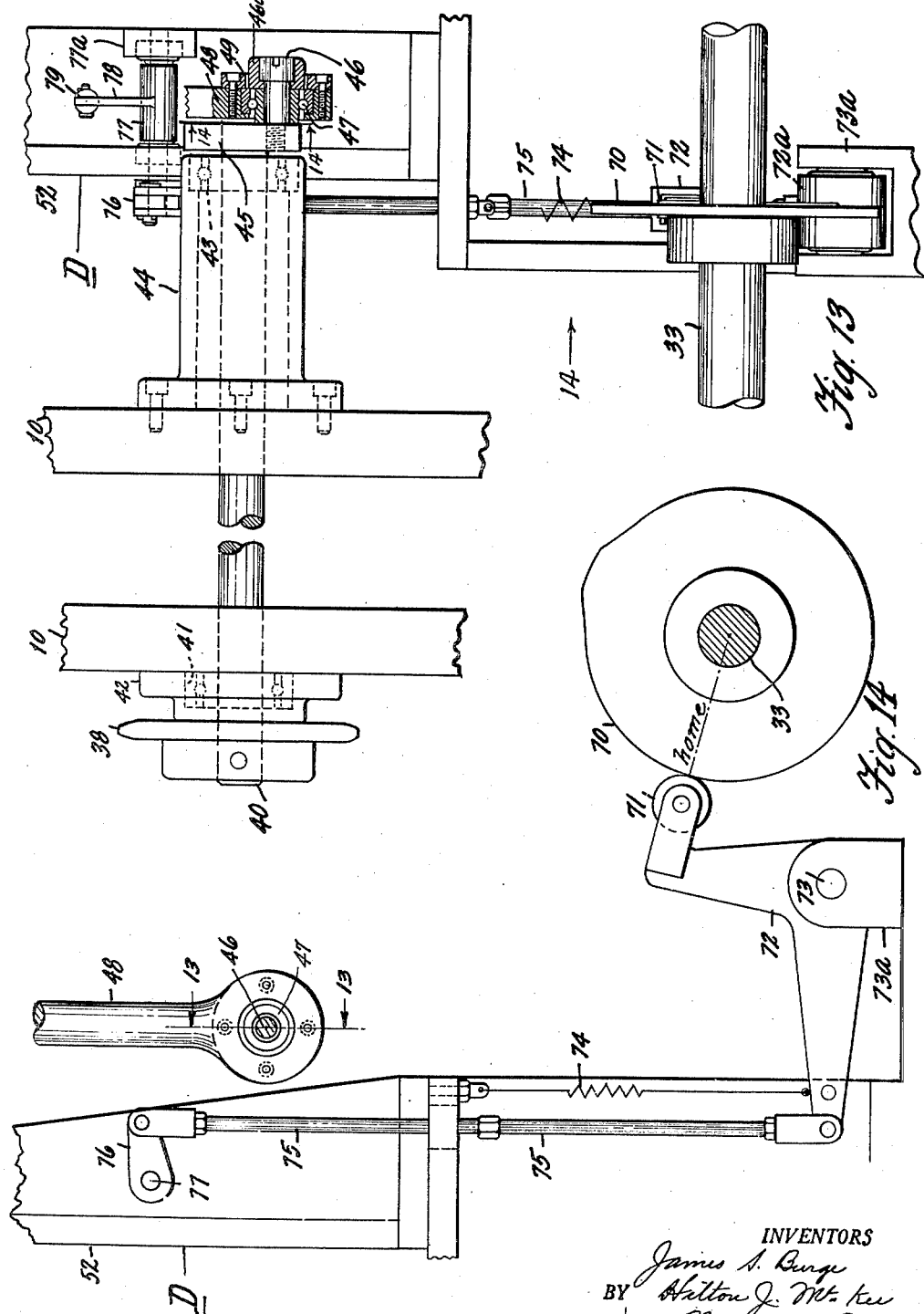

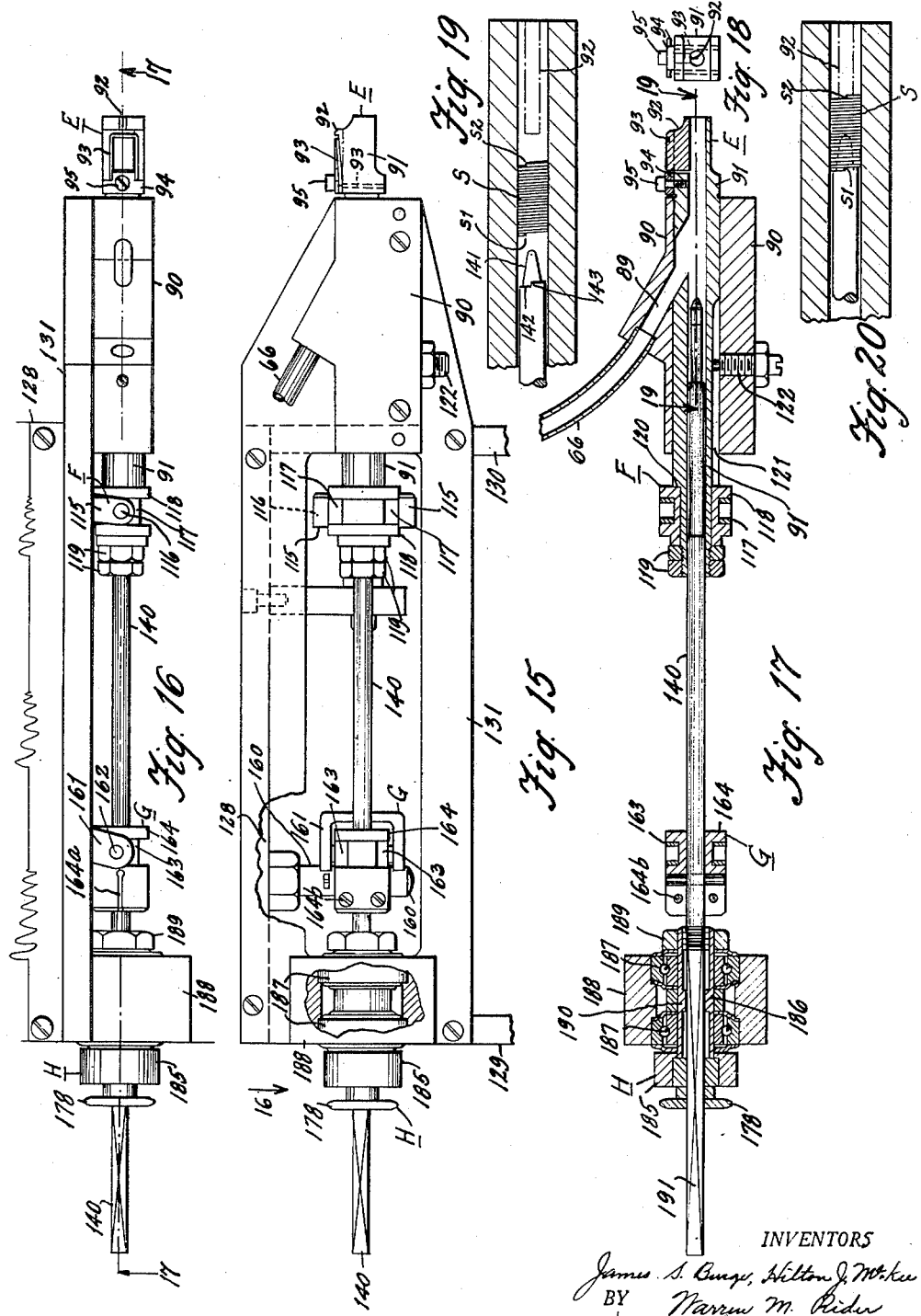

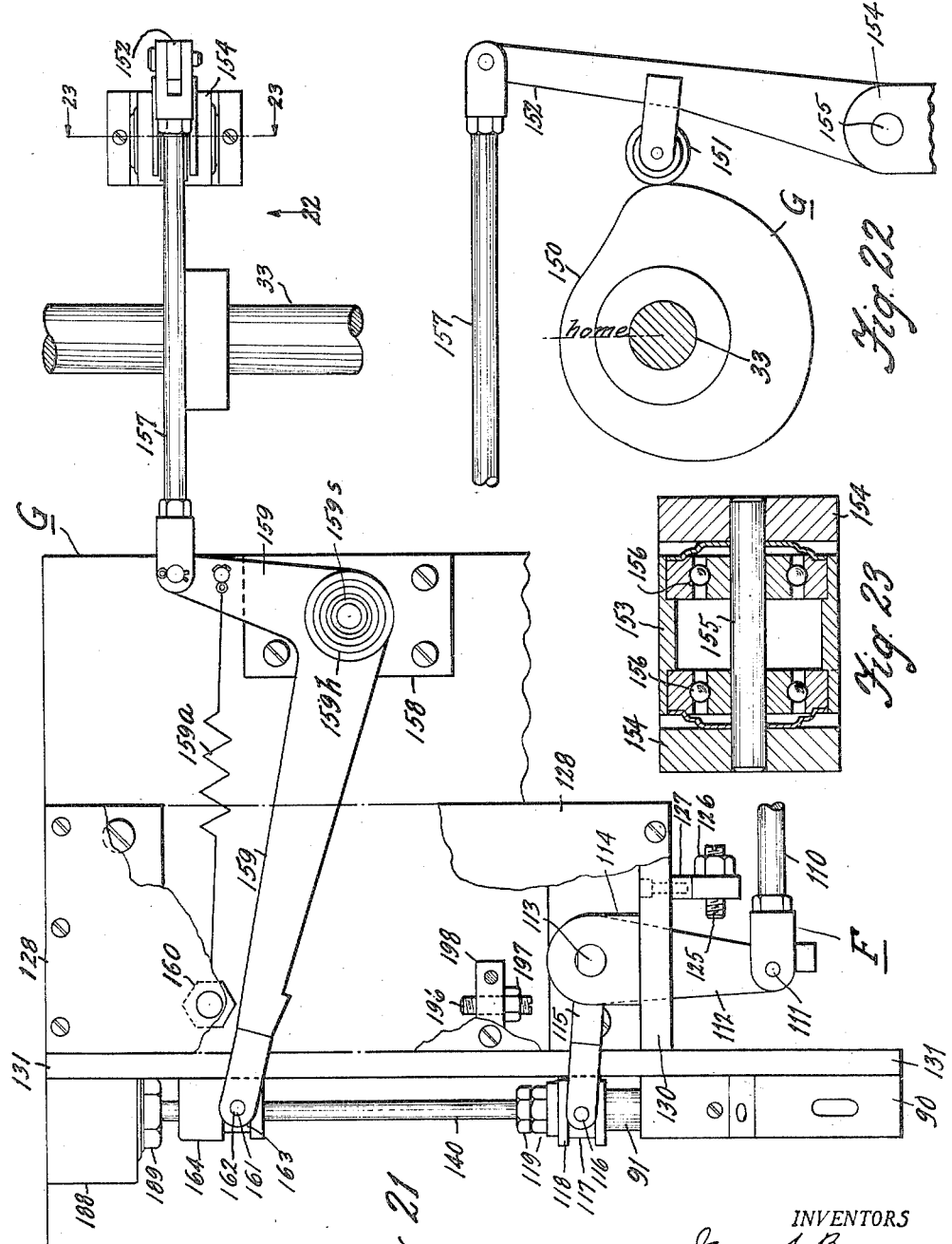

May 2, 1950   J. S. BURGE ET AL   2,505,942
SPRING LOOP FORMING DEVICE
Filed Jan. 9, 1947   12 Sheets-Sheet 9

INVENTORS
James S. Burge
Hilton J. McKee
BY Warren M. Rider
Spencer Hardman & Fehr
their attorneys May 2, 1950  J. S. BURGE ET AL  2,505,942
SPRING LOOP FORMING DEVICE
Filed Jan. 9, 1947  12 Sheets-Sheet 10
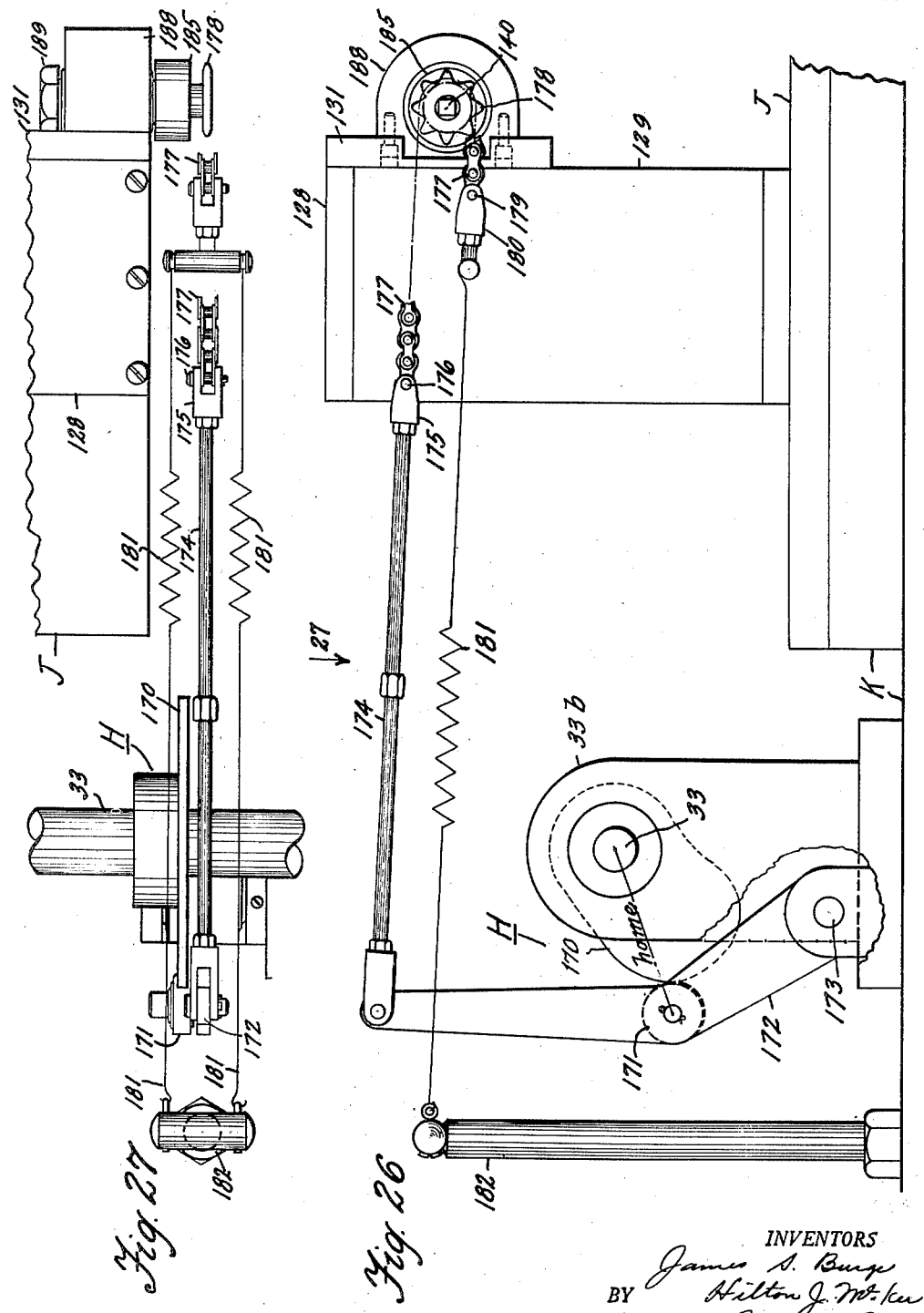
INVENTORS
James S. Burge
Hilton J. McKee
Warren M. Rider
BY Spencer Hardman & Fehr
their attorneys INVENTORS
JAMES S. BURGE
HILTON J. McKEE AND
WARREN M. RIDER By Spencer, Hardman & Fehr
their ATTORNEYS Patented May 2, 1950

2,505,942

UNITED STATES PATENT OFFICE 2,505,942

SPRING LOOP FORMING DEVICE

James S. Burge, Anderson, Hilton J. McKee, Middletown, and Warren M. Rider, Anderson, Ind., assignors to General Motors Corporation, Detroit, Mich., a corporation of Delaware Application January 9, 1947, Serial No. 721,068

5 Claims. (Cl. 140—103)

This invention relates to the manufacture of helical springs provided at their ends with loops which lie in the same plane.

An object of the invention is to provide a machine which receives springs as formed by a spring coiling machine and bends the end turns of each spring in such a manner that the completed spring will have its end loops lie in the same plane.

Further objects and advantages of the present invention will be apparent from the following description, reference being had to the accompanying drawings, wherein a preferred embodiment of the present invention is clearly shown.

In the drawings:

Fig. 1 is a perspective view of a machine embodying the present invention.

Fig. 4 is a sectional view on line 4—4 of Fig. 2 showing loop-forming dies.

Fig. 5 is a sectional view on line 5—5 of Fig. 4.

Fig. 6 is a sectional view showing on a larger scale, some of the parts shown in Fig. 4 in closed position with a spring between them.

Fig. 7 is a fragmentary sectional view on line 7—7 of Fig. 4 and looking in the direction of arrow 7 of Fig. 6.

Fig. 8 is a plan view of a mechanism for retaining a spring upon a workholder provided by the lower die, the part in section being taken on the line 8—8 of Fig. 9.

Fig. 9 is a sectional view on line 9—9 of Fig. 8.

Fig. 10 is a front elevation partly in section of the hopper feed.

Fig. 11 is a side view thereof partly in section on line 11—11 of Fig. 10.

Fig. 12 is a fragmentary sectional view on line 12—12 of Fig. 11.

Fig. 13 is a rear elevation in the direction of arrow 13 of Fig. 11 showing the mechanism for operating the hopper feed, the part in section being taken on line 13—13 of Fig. 14.

Fig. 14 is a view looking in the direction of arrow 14 of Fig. 13, the part in section being on line 14—14 of Fig. 13.

Fig. 15 is a front elevation of a mechanism for feeding the springs horizontally after they descend from the hopper feed.

Fig. 16 is a fragmentary plan view in the direction of arrow 16 of Fig. 15.

Fig. 17 is a sectional view on line 17—17 of Fig. 16.

Fig. 18 is an end view of the adjacent parts in Fig. 17.

Fig. 19 is a sectional view on line 19—19 of Fig. 17 and is drawn to a larger scale showing a spring in its location before the horizontal movement of the spring to the right has started.

Fig. 20 is a view similar to Fig. 19, showing the spring as it is moved horizontally.

Fig. 21 is a plan view showing portions of the mechanisms for shifting the spring horizontally.

Fig. 22 is a fragmentary side view in the direction of arrow 22 of Fig. 21.

Fig. 23 is a sectional view on line 23—23 of Fig. 21.

Fig. 26 is a view in the direction of arrow 26 of Fig. 1, showing a mechanism for causing the spring to turn as it moves horizontally.

Fig. 27 is a view in the direction of arrow 27 of Fig. 26.

Referring to Fig. 1, the machine comprises a punch press A for causing an upper die assembly B to move relative to a lower die assembly C for the purpose of forming the spring loops. The springs are fed by a hopper feed D to a guide E capable of horizontal movement relative to the dies. The guide E is operated by a mechanism F. The spring within the guide E is moved relative to the guide to deposit it upon the lower die C by a mechanism G and, during such movement, the spring is turned by a mechanism H for the purpose of bringing the end turns of the spring into proper position.

Figure 3:
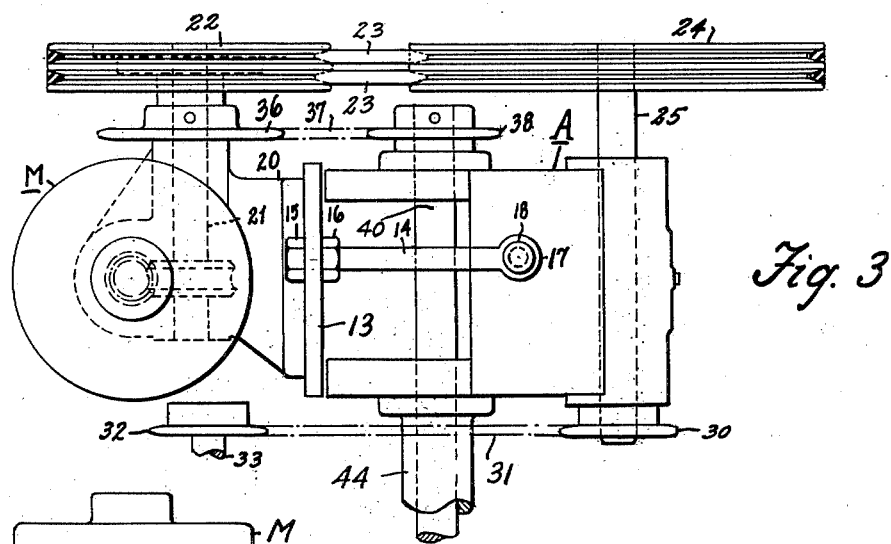
Figs. 2 and 3 are diagrams showing the transmission power from an electric motor to various shafts.
Figure 2:
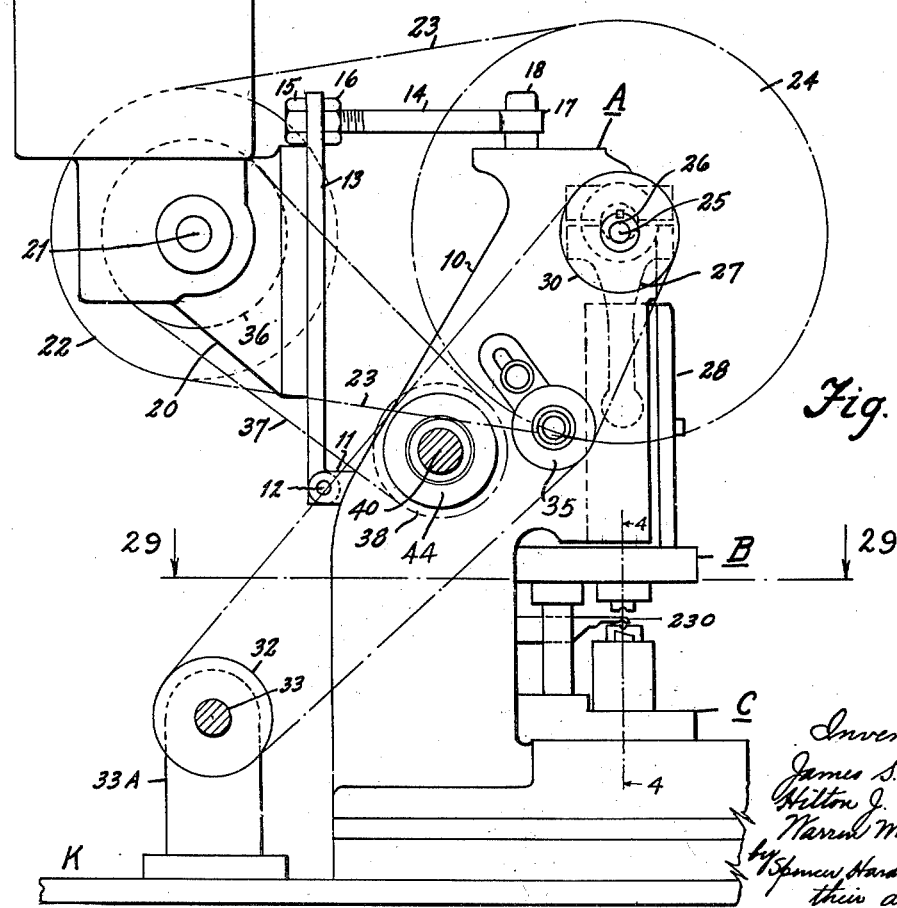
Figure 24:
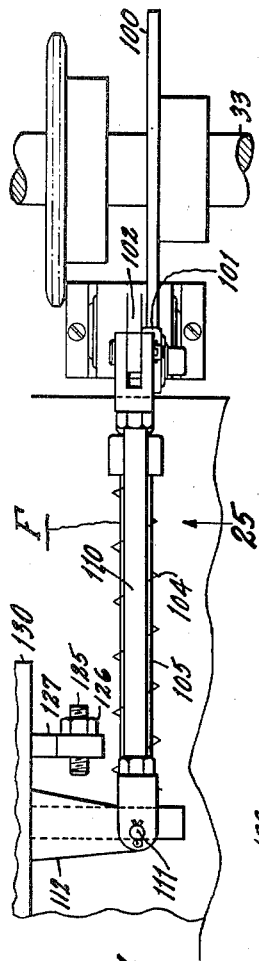
Fig. 24 is a fragmentary plan view showing the continuation of one of the mechanisms shown in Fig. 21.

Referring to Figs. 2 and 3, the frame 10 of the press A provides a bracket 11 carrying a hinge pin 12 with which a plate 13 is pivotally connected. Plate 13 receives a screw 14 engaging nuts 15 and 16 and having an eye 17 attached by a screw 18 to the press frame. Plate 13 supports a frame 20 enclosing a speed reducer 21 and supporting an electric motor M which, through the speed reducer, drives pulley 22. Shaft 22 is connected by a double belt 23 with a flywheel pulley 24 which drives the press crankshaft 25 having an eccentric 26 connected with a pitman or connecting rod 27 for reciprocating a press slide or ram 28 which carries the upper die assembly B. The belts 23 are tightened by shifting the nuts 15 and 16 along the screw 14 in order to move the plate 13.

The shaft 25, which is connected to the flywheel 24 by the usual clutch (not shown) which automatically disengages at the end of one revolution of shaft 25, drives a sprocket 30 connected by a chain 31 with a sprocket 32 of the same diameter as 30, which drives a cam shaft 33 supported by bearing brackets 33A and 33b (see Figs. 1 and 26). Chain 31 passes over an idle sprocket 35 which is adjustable vertically to take up the slack in the chain. Cam shaft 33 makes one revolution for each revolution of the press shaft 25. Speed reducer pulley 22 drives a sprocket 36 connected by a chain 37 with a sprocket 38 which drives a shaft 40.

Referring to Fig. 13, shaft 40 is supported by a bearing 41 mounted in a plate 42 and in a bearing 43 supported by tubular bracket 44. Press frame 10 supports parts 42 and 44. Shaft 40 drives a crank disc 45 carrying a crank pin stud 46 on which is journaled a ball bearing 47. The pin passes through a washer 46a which holds the inner race against the crank disc 45 and the outer race of which is secured to connecting rod 48 by a plate 49. Referring to Figs. 10 and 11, rod 48 is connected with a lever 50 pivoted at 51 on a frame 52 which supports a bracket 53 carrying a hopper 54 for receiving springs. The neck or outlet 55 of the hopper provides a bearing sleeve 56 for a jiggler 57 having a grooved collar 58 receiving pins 59 carried by the bifurcated right end 60 of lever 50. The jiggler 57 is tapered, as shown in Fig. 10, at its upper end to assist in causing the springs to descend through the central bore of the jiggler and through a tube 61 supported by brackets 62 and 63 attached to frame 52 and merging with a tube 64 supported by bracket 63 and a bracket 65 and leading into a discharge tube 66.

To provide for discharge of the springs singly through the tube 66, the mechanism shown in Figs. 11, 13 and 14 is provided. This mechanism includes a cam 70 driven by shaft 33 in engaging a follower 71 carried by lever 72 pivoted at 73 on a bracket 73a and urged clockwise by a spring 74. Lever 72 is connected by rod 75 with a lever 76 attached to a shaft 77. Shaft 77 (Fig. 12) provides a lever 78 which operates a horizontally moving rod 79 (Fig. 11) having a projection 80 received within the tube 64. Rod 79 has a shoulder 81 for receiving the lower end of lever 82 pivoted at 83 and having its upper end engageable with a shoulder 84 of a rod 85 having a projection 86 extendable within the tube 64. Bracket 85a supports rods 85 and 79 and lever 82. A spring 87 urges the rod 85 toward the right to maintain the engagement of shoulder 84 with lever 82 and the latter with the shoulder 81 of the rod 79. As the cam 70 rotates, the rods 79 and 85 are caused to reciprocate in opposite directions, thereby causing the springs to drop singly through the tube 66.

The spring passes singly from the tube 66 through an opening 89 in a guide support 90 and into a guide 91 (E in Fig. 1) supported for horizontal movement by part 90 (see Figs. 15 to 17). The right end of the tube 91 through which the spring must pass to the dies B and C receives a shoe 92 urged downwardly by a bale spring 93 retained by a block 94 and a screw 95. The spring engaging surface of shoe 92 is indicated by dot-dash lines in Figs. 19 and 20. The purpose of the shoe is to supply yielding pressure of the spring S so as to resist its horizontal and rotary movement by means to be described.

Figure 25:
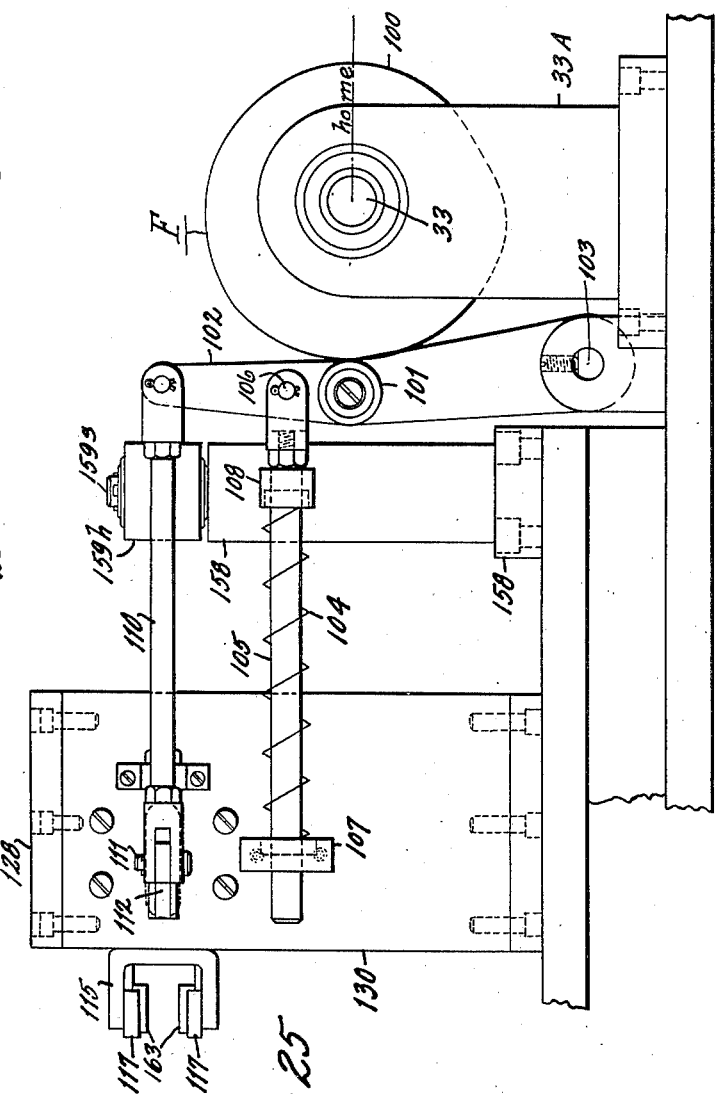
Fig. 25 is a side elevation thereof in the direction of arrow 25 of Fig. 24.

The guide 91 is shifted horizontally toward and away from the dies by a means which includes a cam 100 (Fig. 25) driven by shaft 33 and engaging a follower 101 carried by lever 102 pivoted at 103 and urged clockwise by a spring 104 surrounding a rod 105 attached at 106 to the lever and supported by a bracket 107. Spring 104, which is retained under compression between the bracket 107 and a spring seat 108 provided by the rod 105, urges the rod 105 toward the right. The upper end of the lever 102 is pivotally connected with a rod 110 pivotally connected at 111 with a lever 112 which as shown in Fig. 21, is pivotally supported on a rod 113 carried by brackets 114. Lever 112 is provided with a bifurcated arm 115 carrying pins 116 connected with shoes 117 received by a grooved collar 118 which nuts 119 (Fig. 17) clamp against a shoulder 120 of the guide 91 which is provided with a longitudinal slot 121 receiving the end of a screw pin 122 attached to the guide support 90. A function of this mechanism is to place the end of the guide 91 close to the dies while they are separated so that a spring, discharged from the guide by means to be described, will be placed upon the lower die; and then to retract the guide before the dies are closed. Referring to Fig. 21, the approach of the guide 91 to the dies is limited by stop screw 125 engaged by the lever 112. Nut 126 retains screw 125 in adjusted position relative to a bracket 127 which is fixed to an upright plate 130 which supports the brackets 127 and 114 and a plate 131 which supports the part 90.

The spring S received within the guide 91 is shifted horizontally relative thereto as well as to the guide support 90 by a rod or arbor 140 having a tip 141 (Fig. 19) which projects into the spring and having a helical surface 142 of the same pitch as the spring coils and a shoulder 143 capable of engaging a cut-off end s1 at the left end of spring S. As the rod 140 is moved right by means to be described, it pushes the spring S under the shoe 92 which resists motion of the spring. As the rod 140 moves right, it also rotates and the surface 143 thereof engages spring end s1. When one turn of rotation of rod 140 in one direction is completed, the spring left end s1 will be located in a vertical plane (see Fig. 20) intersecting the center line of the spring and the right end s2 of spring will also be located in said vertical plane. During rotation of spring S for the purpose described, it is deposited on the spring support 212 (Fig. 4) of die assembly C and is clamped thereagainst by a finger 230 so that the spring S remains on the workholder 212 in correct position after the guide E or 91 and the arbor 140 have been retracted to the left.

The means for shifting the rod or arbor 140 horizontally is shown in Figs. 15, 16, 17, 21 and 22. A cam 150 driven by shaft 33 actuates a follower 151 carried by a lever 152 having a hub 153 (Fig. 23) journaled on bearings 156 supported by a rod 155 supported by a bracket 154. This means for pivotally supporting levers is typical of the supports used for other levers of operating mechanisms. Lever 152 is connected by rod 157 with a lever 159 whose hub 159h is journaled on a stud 159S supported by a bracket 158. Springs 159a connected with the lever 159 and a stud 160 urge the levers 152 and 159 counterclockwise. Lever 159 has a bifurcated end 161 carrying pins 162 engaging shoes 163 received by a grooved collar 164 connected with the arbor 140. The hub of the collar 164 is split at 164a (Fig. 16) and receives screws 164b by which said hub can be clamped to the arbor 140.

The arbor 140 is rotated by a mechanism shown in Figs. 26 and 27 which comprises a cam 170 driven by shaft 33 and engageable with a follower 171 carried by a lever 172 pivoted at 173 and connected by a rod 174 with a clevis 175 supporting a pin 176 connected with a chain 177 which passes around a sprocket 178 and is connected by a pin 179 with a clevis 180 connected by a pair of springs 181 with a spring post 182. The springs 181 operate to maintain the roller 171 in engagement with the cam 170 and to effect clockwise movement of the sprocket 178. As shown in Fig. 17, sprocket 178 is connected with the head 185 of a tubular shaft 186 supported by ball bearings 187 mounted in a bracket 188 supported by a plate 131 which is supported by the vertical plate 130 and a vertical plate 129 (Fig. 26) which supports the top plate 128. Horizontal movement of the shaft 186 is prevented by a nut 189 threaded thereon. The tubular shaft 186 has an internally squared portion 190 which receives the squared portion 191 of arbor 140, thereby providing a driving connection between the sprocket 178 and the arbor 140 in any horizontal position of the latter. The mechanism causes the arbor 140 to make one revolution during each cycle. Consequently the spring ends s1 and s2 will always be brought to the vertical plane before mentioned regardless of location of these spring ends prior to the rotation of the arbor 140. The extent of the horizontal movement of the arbor 140 is controlled by a stop screw 196 (Fig. 21) retained in adjusted position by set screw 197 in relation to a bracket 198 supported by the plate 128 which also supports the spring stud 160.

Referring to Fig. 4, the lower die assembly C comprises a base plate 200 supporting a plate 201 and a U-shaped block 202, to which side plates 203 (Fig. 5) are attached by dowels 203b and screws 203a. Within the block 202 there are located two blocks 205 and 206 having spring-loop engaging surfaces 207 and 208, respectively, which are inclined in opposite directions as shown in Fig. 7. Between the blocks 205 and 206 there is located a loop spreader 211 having loops engaging edges 209 and 210, respectively, for engaging the left and right end turns of spring S. Between the surfaces 209 and 210 there is located a spring-receiving block 212 supported by a pin 213 and urged upwardly by a spring 214 (Fig. 6). The block 212 has a notch 215 (Fig. 5) for receiving the spring. The parts 205, 211 and 206 are supported in normal position by springs 216, 217 and 218, respectively, which urge these parts upwardly so that the upper side surfaces of notches 204 in plate 203 receive side lugs of these parts. Side lugs 205a of part 205 are shown in Fig. 7. Side lugs 211a of part 211 are shown in Fig. 5. Part 206 has side lugs like 205a of part 205.

The upper die assembly B comprises a plate 220 having holes therethrough for receiving pilot rods 221 attached to the base plate 200. Plate 220 supports a block 222 providing faces 223 and 224 (Fig. 7) parallel respectively to surfaces 207 and 208 of blocks 205 and 206. Block 222 supports a pressure pad 225 urged downwardly by a spring 226 retained by a plug 227. Pad 225 provides a notch 228 (Fig. 5) for receiving a part of the spring and a notch 229 (Fig. 4) transverse to notch 228 which provides clearance for retaining finger 230 (Fig. 9) provided by a bar 231 pivoted at 232 on a post 233 and urged downwardly by springs 234. Before the spring S is located upon member 212, the finger 230 is raised by a mechanism comprising a cam 240 (Fig. 9) operated by a shaft 33 and contacting a roller 241 carried by a lever 242 pivoted at 243 on a bracket 243a and connected with a lever 244 which is urged clockwise by a spring 245. Lever 244 is connected by a link 246 with a lever 247 having a hub 247a which, as is shown in Fig. 8, is supported by bearings 248 supported by a rod 249. Lever 247 carries a roller 250. When the cam 240 engages the roller 241 as shown in Fig. 9, the finger 230 is raised to permit location of the spring S upon the spring holder 212. When the low land of the cam 240 engages the roller 241, the roller 250 drops to permit the springs 234 to pull finger 230 down against the spring S.

After the spring S has been placed by mechanisms F and G upon the workholder 212 and has been engaged by the finger 230 and rotation of the spring S has been completed by mechanism H to locate its end turns properly, and after the retraction of the mechanisms F and G to clear the dies, the upper die assembly B is cause to descend to force the spring into the position shown in Fig. 6, thereby causing relative movement between the spring and the parts 209 and 210 which cause the end turns of the spring to be bent outwardly so that they may be engaged, respectively, by surfaces 207, 223 and by surfaces 208, 224 as shown in Fig. 7. The spring loops or eyes formed by the end turns are in oppositely inclined planes in Fig. 7. The divergency of these planes is such that when the die assembly B is elevated the end loops of spring S will return by spring resiliency to the same plane. After the spring S is thus provided with eyes, the finger 230 is lifted; and another spring is pushed to the right upon the part 212 and the finished spring falls into a chute X (Fig. 1).

Figure 28:
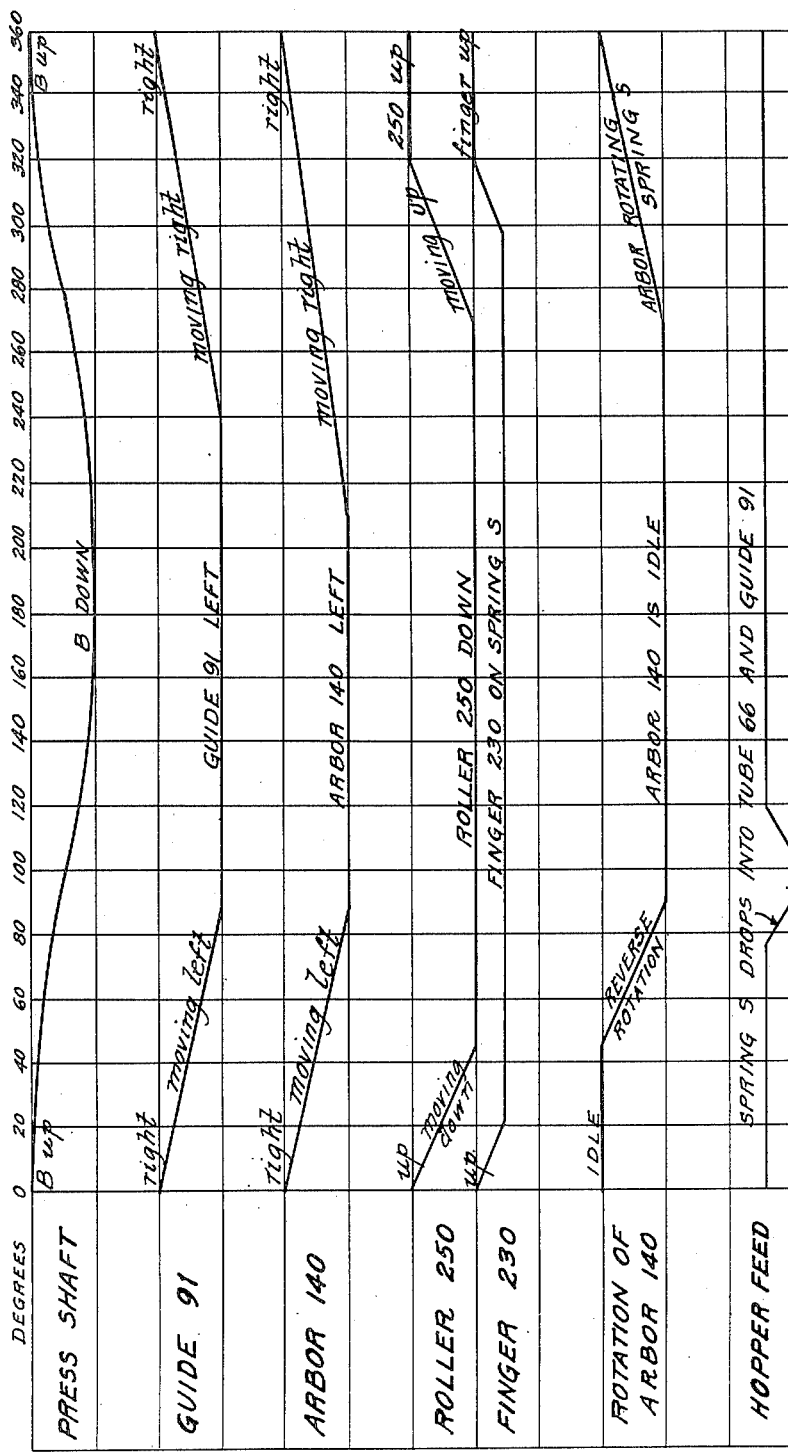
Fig. 28 is a timing chart.
Figure 29:
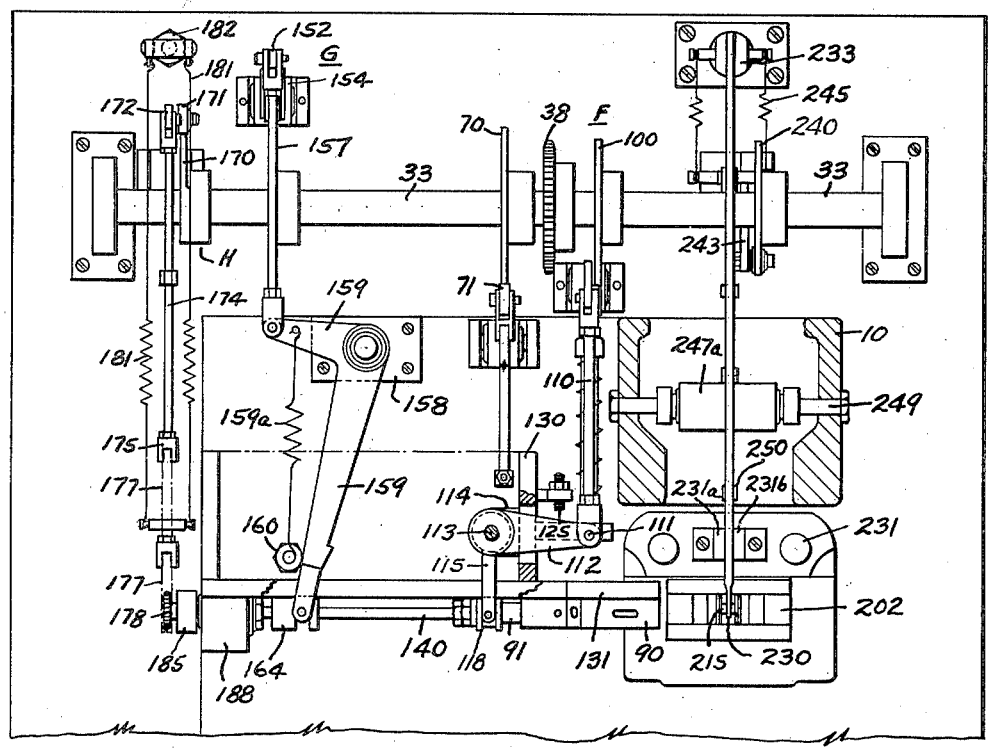
Fig. 29 is a detail plan view showing the arrangement of cams on a shaft and taken on line 29—29 of Fig. 2.

On each drawing of the cams, cam 70 (Fig. 14), cam 100 (Fig. 25), cam 150 (Fig. 22), cam 170 (Fig. 26), cam 240 (Fig. 9), there is placed a dot-dash line marked "home." The "home" line of the cam will intersect the axis of the cam follower roller when the cam is in "home" position which it occupies at the end of a cycle which is the instant the press die B is in upper position and the press would ordinarily stop due to the normal action of its clutch. Consequently the movements of the mechanisms take place as shown in Fig. 28. As long as motor M operates, jiggler 57 (Fig. 11) reciprocates.

Ordinarily the press shaft would stop automatically at the end of one revolution. The cycle is started by moving lever L down for an instant. A spring not shown urges lever L up to cause the press clutch to disengage at the end of one revolution of the press shaft. To maintain continuous operation of the press shaft, the lever L is held down by moving to the left a handle N attached to a latch bar not shown.

Table K (Fig. 1) supports the press A and cam shaft 33 and the structure J of parts 128, 129, 130 and 131 which support guide E, guide support 90, arbor 140 and parts of mechanisms F, G and H.

Figure 30:
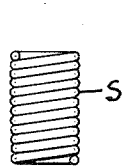
Fig. 30 shows a severed length of a helical coiled spring before the loops on opposite ends thereof are formed.
Figure 31:
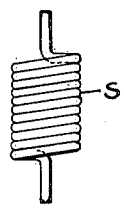
Fig. 31 is a plan view of the spring after the loops have been formed by the machine.

The operation of the present machine is as follows: During the operation of the machine a length of a helical coiled spring, as shown in Fig. 30, is released from the tube 64 by opposite reciprocating movements of the rods 79 and 85 (Fig. 11) as heretofore described. When the rod 79 is moved to the left the required distance a single spring is released and descends into guide 91 in front of arbor 140 after which the arbor moves the spring S to the right (Fig. 17) to place the spring under shoe 92 which resists horizontal and rotary movement of the spring. When the arbor 140 moves to the right it is rotated one revolution so that the ends of the spring will be in a vertical plane. During the rotation of the spring the arbor places the spring upon support 212 (Fig. 4). The spring is then held on the support by finger 230. Before the spring is positioned on the support the finger is raised and out of the path of the spring. When the spring is on the support the finger grips the spring and the guide 91 and arbor retract to the position to receive another spring. As the spring is being held by finger 230 on the support 212 the upper die assembly B descends causing the outer ends of the spring to be bent outwardly (Fig. 6) so that they may be engaged, respectively by surfaces 207, 223 and by surfaces 208, 224 (Fig. 7). The spring loops formed by the end turns are in oppositely inclined planes. When the die B is elevated the end loops of spring S will return by spring resiliency to the same plane. After the spring S is formed with loops the finger 230 is lifted, another spring is placed on the support 212 by the arbor 140 and the finished spring falls into the chute X (Fig. 1).

While the embodiment of the present invention as herein disclosed, constitutes a preferred form, it is to be understood that other forms might be adopted, all coming within the scope of the claims which follow.

What is claimed is as follows:

1. A machine for forming loops or eyes on the ends of helical coil springs comprising a press having dies for bending the end turns of the spring away from the other turns, a spring guide which guides the spring for axial movement toward the dies, means for moving the guide to a location close to the dies while separated and for retracting the guide in advance of the closing of the dies, a tube receiving springs in stacked relation, means for causing springs to pass singly from the tube to the guide, means for moving a spring axially in the guide to a location between the dies and for turning it to position its end turns correctly, means for retaining the spring in the correct position between the dies while they are closing, and means for operating the press and all of said means in timed relation.

2. A machine for forming loops or eyes on the ends of helical coil springs comprising a press having dies for bending the end turns of the spring away from the other turns, a hopper for containing springs, a discharge tube, means for causing springs to be discharged from the hopper axially into the tube, means for causing the springs to be discharged singly from the tube, a spring guide which receives springs discharged singly from said tube and guides a spring axially toward the dies, means for moving the guide to a location close to the dies while separated and for retracting the guide in advance of the closing of the dies, means for moving a spring axially in the guide to a location between the dies and for turning it to position its end turns correctly, means for retaining the spring in the correct position between the dies while they are closing, and means for operating the press and all of said means in timed relation.

3. A machine for forming loops or eyes on the ends of helical coil springs comprising, a press having a stationary die and a vertically movable die for bending the opposite end turns of the spring simultaneously away from the other turns, said stationary die including a biased spring-receiving block vertically shiftably mounted therein and said movable die having a pad shiftably mounted therein, said pad being biased whereby when the pad engages the spring it will cause the spring and the block to move inwardly within the stationary die which causes the end turns of the spring to be bent outwardly by the dies; means for feeding the springs on the pad, and means for operating the feeding means and the press in timed relation.

4. A machine for forming loops or eyes on the ends of helical coil springs comprising, a press having a stationary die and a vertical movable die for bending the opposite end turns of the spring simultaneously away from the other turns, said stationary die including a biased spring receiving block vertically shiftably mounted therein and said movable die having a pad shiftably mounted therein, said pad being biased whereby when the pad engages the spring it will cause the spring and the block to move inwardly within the stationary die which causes the end turns of the spring to be bent outwardly by the dies; means for moving a spring axially to a location between the dies and for turning it to position its end turns correctly on the block; means for retaining the spring in correct position on the block while the dies are closing; and means for operating the press and all of the means in timed relation.

5. A machine for forming loops or eyes on the ends of helical coil springs comprising, a press having a stationary die and a vertical movable die for bending the opposite end turns of the spring simultaneously away from the other turns, said stationary die including a biased spring-receiving block vertically shiftably mounted therein and said movable die having a pad shiftably mounted therein, said pad being biased whereby when the pad engages the spring it will cause the spring and the block to move inwardly within the stationary die which causes the end turns of the spring to be bent outwardly by the dies; a spring guide which guides the spring for axial movement toward the dies; means for moving the guide to a location close to the dies while separated and for retracting the guide in advance of the closing of the dies; an arbor movable axially within the guide to push the spring axially out of the guide to a location between the pad and block of the dies and having projection means engageable with the end surface of an end turn of the spring whereby rotation of the arbor while it engages a spring causes the spring end loops to be correctly located relative to the pad and block; means for moving the arbor axially, means for rotating the arbor; means for retaining the spring in correct position on the block while the movable die approaches the stationary die; and means for operating the press and all of said means in timed relation.

JAMES S. BURGE.
HILTON J. McKEE.
WARREN M. RIDER.

(References on following page)

REFERENCES CITED

The following references are of record in the file of this patent:

UNITED STATES PATENTS

| Number | Name | Date |
|---|---|---|
| 689,520 | Sanker | Dec. 24, 1901 |
| 1,065,336 | Bigelow | June 24, 1913 |
| 1,083,223 | Sleeper | Dec. 30, 1913 |
| 1,114,846 | Barrett et al. | Oct. 27, 1914 |
| 1,229,572 | Birnzweig | June 12, 1917 |
| 1,258,414 | Jacoby | Mar. 5, 1918 |
| 1,627,600 | Gail | May 10, 1927 |
| 1,780,433 | McGregor | Nov. 4, 1930 |
| 1,873,626 | Migro | Aug. 23, 1932 |
| 2,188,705 | Cook | Jan. 30, 1940 |
| 2,334,505 | Peterson | Nov. 16, 1943 |